Figure 1:
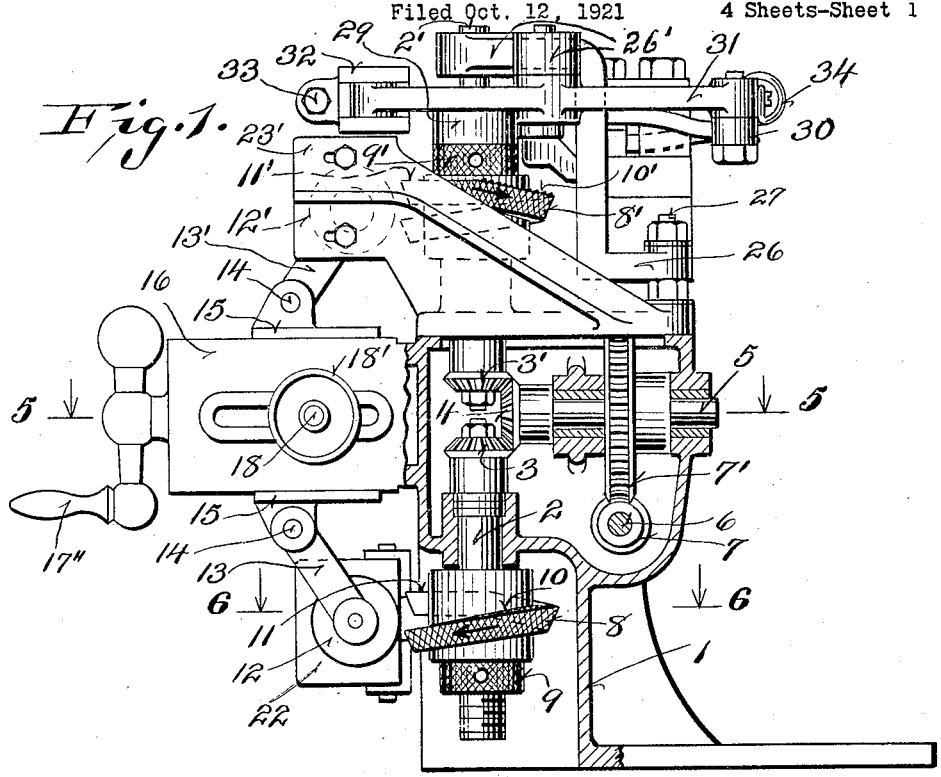

March 31, 1925.                                                    1,531,830
O. H. BANKER
BAND SAW SHARPENER
Filed Oct. 12, 1921                           4 Sheets-Sheet 1

Inventor
Oscar H. Banker
By Young and Young
Attorneys

Witness
T. P. Britt

March 31, 1925. 1,531,830
O. H. BANKER
BAND SAW SHARPENER
Filed Oct. 12, 1921 4 Sheets-Sheet 2

Inventor
Oscar H. Banker

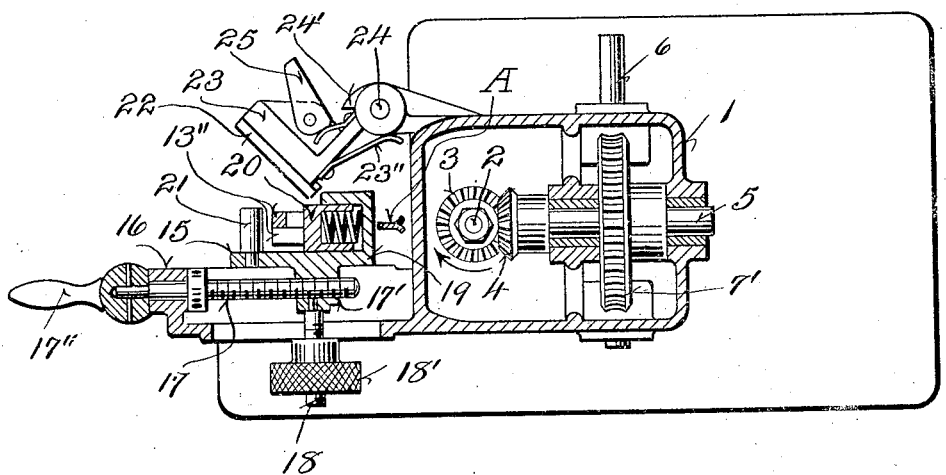
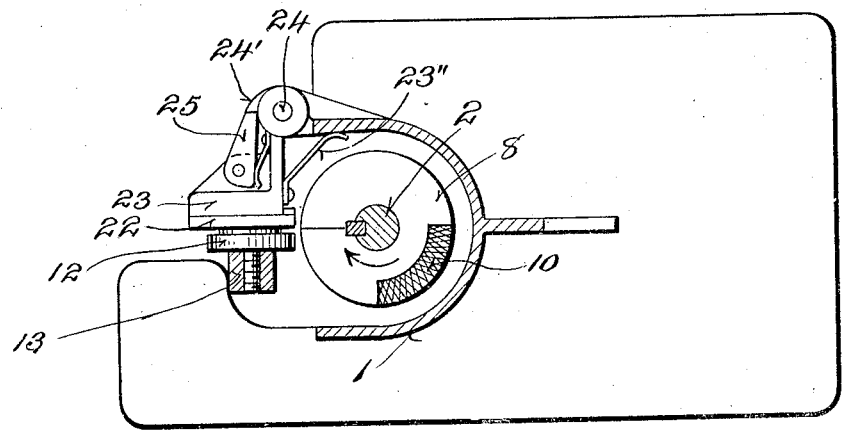

March 31, 1925.                       O. H. BANKER                       1,531,830
                                   BAND SAW SHARPENER
                                    Filed Oct. 12, 1921                4 Sheets-Sheet 4
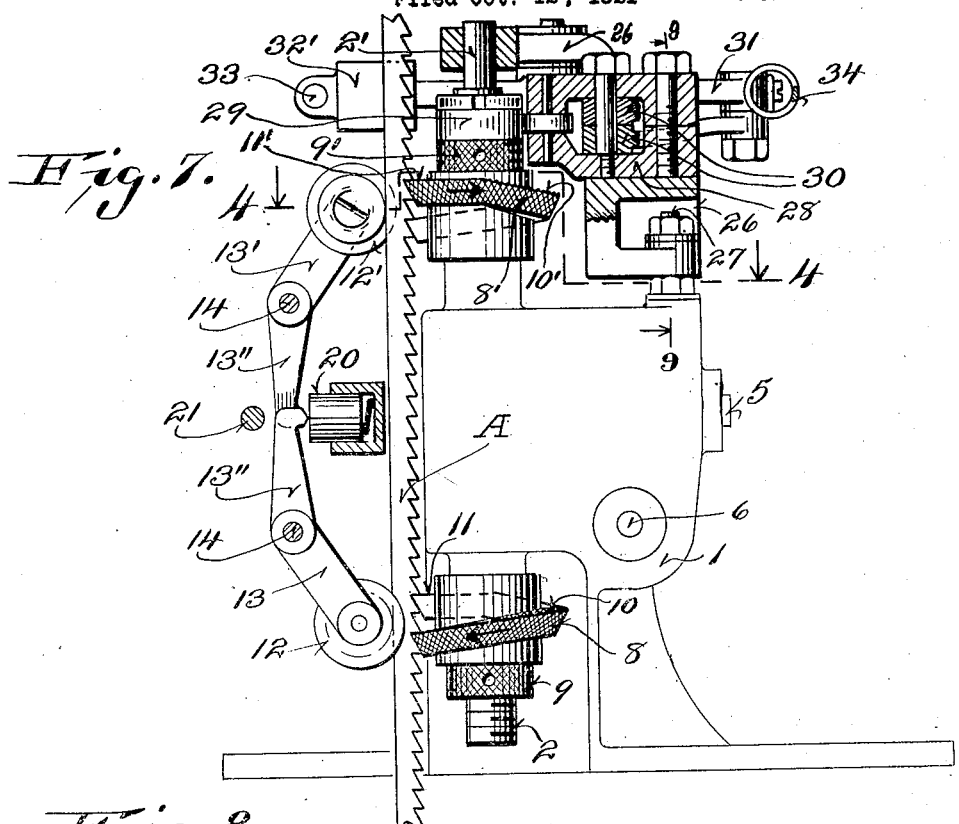
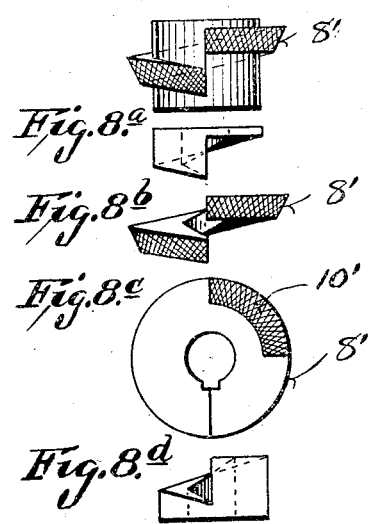
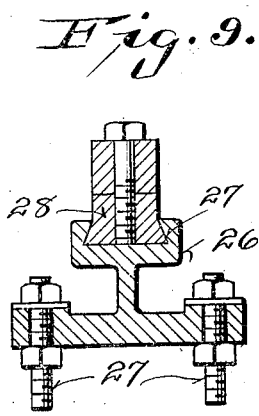
Inventor
Oscar H. Banker
By Young and Young
Attorneys Patented Mar. 31, 1925.

1,531,830

UNITED STATES PATENT OFFICE.

OSCAR H. BANKER, OF RACINE, WISCONSIN.

BAND-SAW SHARPENER.

Application filed October 12, 1921. Serial No. 507,399.

*To all whom it may concern:*

Be it known that I, OSCAR H. BANKER, a citizen of Armenia, and resident of Racine, in the county of Racine and State of Wisconsin, have invented certain new and useful Improvements in Band-Saw Sharpeners; and I do hereby declare that the following is a full, clear, and exact description thereof.

My invention refers to filing and swaging machines essentially comprising a unit which can be adjusted to a band-saw for operation without removal of the saw from its mountings.

The primary object of my invention is to provide a saw filing machine wherein the cut is uniform throughout, and the original gauge of the saw teeth is micromically maintained, the width of the blade also being maintained parallel and uniform.

Other objects of my invention are:

To provide a pair of aligned and spaced spiral file elements having edges corresponding with the shape of the saw teeth, whereby both the cutting faces of the teeth and the backs of the teeth are filed uniformly, it being understood that the file elements are rotated in opposite directions to maintain balance in applying the grinding power and to also insure burrs upon the cutting surface of the teeth being in opposite directions.

To provide the spiral flights of the file elements with continuous filing edges for the backs of the teeth, and associated cutting sections upon the upper surfaces of the flights, whereby the cutting faces of the teeth are filed alternately.

To provide an equalizing presser foot mechanism operating in conjunction with both file elements, whereby uniformity of the cut in the teeth will result, irrespective of variations in the temper of certain parts of the blade.

To provide means for adjusting the file elements with relation to each other, whereby the gauge of the teeth can be micromically maintained, this adjustment being also provided for the purpose of varying the pitch to accommodate different sizes of saw blades.

A further result of this adjustment is that the teeth, when filed, are brought to a uniform pitch, due to the fact that when an uneven or long tooth rests upon one of the file elements, it will lift the correctly gauged tooth associated with the other file elements, whereby only the long tooth will be cut.

Another object of my invention is to provide the spirally shaped file elements with flat sections, to permit delay of the longitudinal feed of the saw after each filing operation, whereby a swaging attachment may function during the delayed movement to thus produce a combination saw filing and swaging machine, the teeth of the saw being set coincident to the delay of the longitudinal feed movement of the blade, which feed movement is effected by the synchronized rotation of the spiral file elements in meshed engagement with the teeth of the saw.

Another object of my invention is to provide simple, economical and effective means for adjusting the saw blade to the filing machine, and locking it against lateral play in its adjusted position.

Another object is to provide means for tensioning the feed presser against the rear edges of the saw.

Another object of my invention is to provide a saw swaging attachment which can be readily removed from the machine or which can be thrown out of operative connection with the same without removal.

The machine, as a whole, essentially comprises a pair of oppositely rotated right and left spiral file elements, which elements act continuously upon the teeth of the saw blade in each cycle to longitudinally feed the saw blade from two spaced points by a cam meshed engagement of the spiral file elements with the cutting faces of pairs of the saw teeth, to thus simultaneously file the beveled back edges of the feed saw, and alternately filing the cutting faces of said teeth. When swaging or setting of the teeth is to be included in the operation, swaging jaws are automatically brought into action during a brief delay in the longitudinal feed of the saw blade at the finishing movement of the spiral file elements in their cycle.

With the above and other objects in view, the invention consists in certain peculiarities of construction and combination of parts as are hereinafter set forth with reference to the accompanying drawings and subsequently claimed.

In the drawings,

Figure 1 represents a side elevation of a combination of swaging and saw filing machine, embodying the features of my invention, with parts broken away and parts in section to more clearly illustrate certain features.

Figure 2:
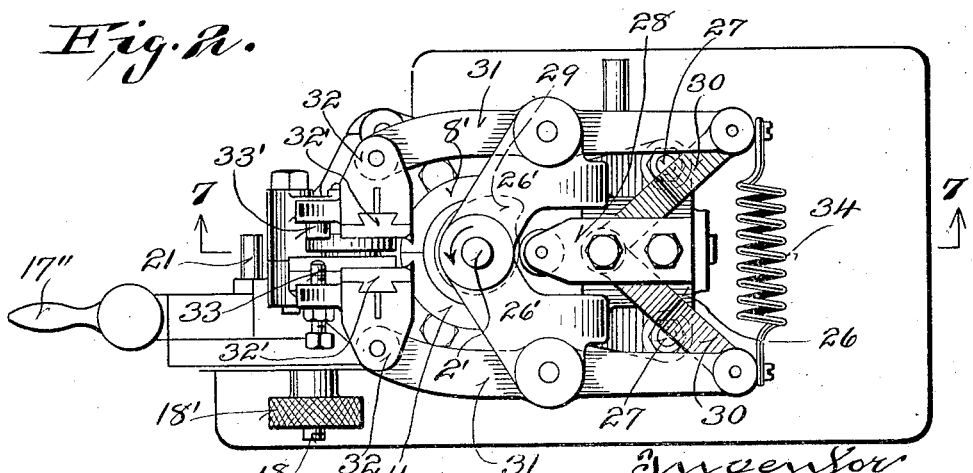

Figure 2, a plan view of the same.

Figure 3:
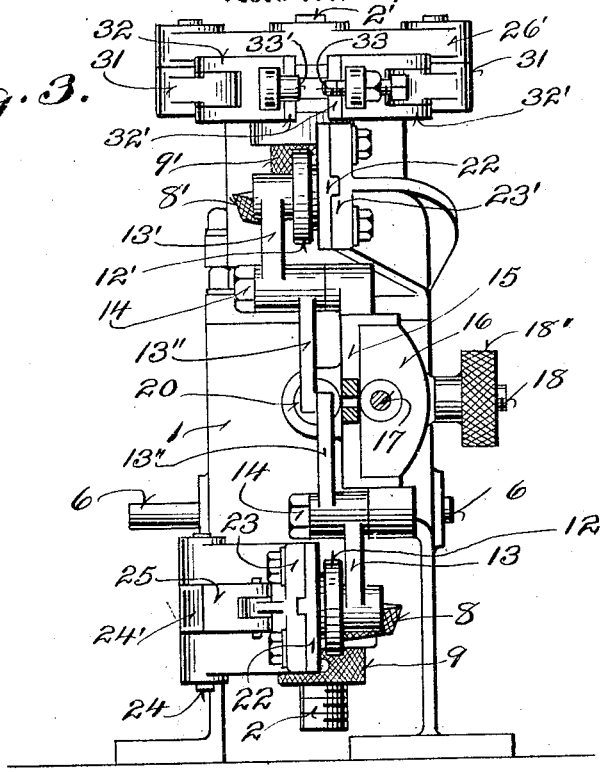

Figure 3, an end view of the machine showing certain minor features in section.

Figure 4:
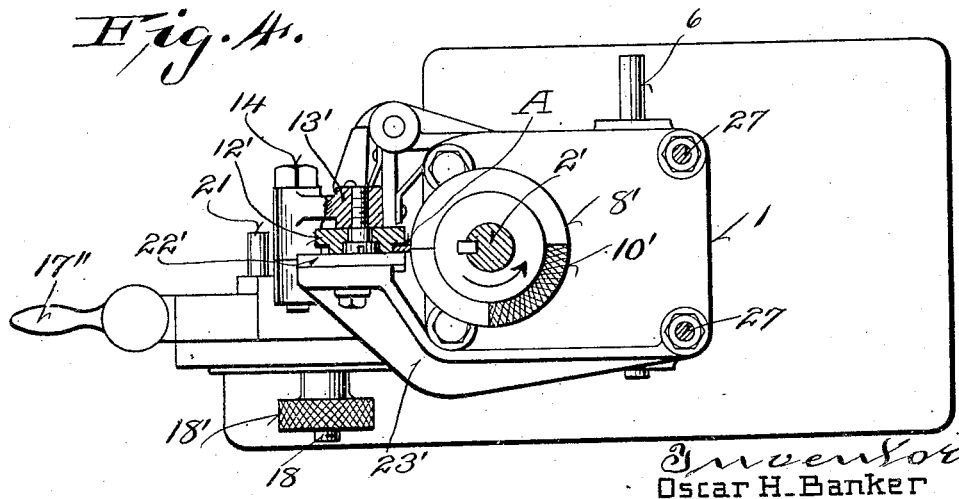

Figure 4, a sectional plan view of the machine, the section being indicated by line 4—4 of Figure 7, and Figures 5 and 6, sectional plan views indicated respectively on lines 5—5 and 6—6 of Figure 1.

Figure 7, a sectional elevation of the machine, the section being indicated generally by line 7—7 of Figure 2.

Figures 8, 8$^a$, 8$^b$, 8$^c$ and 8$^d$, detailed views of one of the spiral file elements.

Figure 9, a detailed section through the swaging attachment, the section being indicated by line 9—9 of Figure 7.

Referring by characters to the drawings 1 represents a hollow bed having journalled, therein, vertically aligned spindles 2—2', the abutting ends of which carry beveled pinions 3—3', which pinions mesh with a corresponding pinion 4 that is mounted upon a counter shaft 5, the same being suitably journaled in the bed. Power is applied to the counter shaft 5 through a drive shaft 6, which carries a worm 7 enmeshed with the worm wheel 7' secured to the counter shaft 5.

The spindles 2 and 2' have keyed thereon, a companion pair of right and left spiral file elements 8—8', ends of the same being interrupted and spaced apart to correspond with the pitch of two teeth of the saw blade A, as shown in Figure 7.

In this exemplification of my invention, one or both of the file elements 8—8' are longitudinally adjusted upon their spindles and locked in their adjusted position by nuts 9—9'. Hence when the machine is adjusted to a band saw for filing, the file elements can be minutely regulated to accurately align them with the pitch of the saw teeth, it being understood that said file elements can be interchanged for larger or smaller sizes.

As shown, the single flight of each file element is formed with a tapered edge face corresponding to the inclined back of the teeth, which face is continuously milled for filing, and the pitch of each element is equal to the distance between two teeth of the blade. Hence, when the spindles are rotated in opposite directions by their gear connection, the spiral flights of the file elements will act as feed worms for feeding the saw longitudinally the distance of two teeth in each cycle. The upper faces of the saw element flights are each provided with segmental abrading or cutting surfaces 10—10' respectively, the same being extended approximately 90° and so positioned with relation to each other that they will alternately engage the straight cutting faces of the saw teeth, whereby the same will be sharpened. Owing to the rotation of these elements in opposite directions, the burr developing incidental to the sharpening will be upon opposite sides of the saw blade, whereby uniformity in the operation is maintained and the power applied in the sharpening, will thus be equalized to prevent warping of the band saw blade from its normal straight line. The same cutting action upon the backs of the teeth will result, due to action upon them by the file cut edge surfaces of the flights.

The upper face of each of the file elements is also provided with a flat segmental surface 11—11', which surface is for the purpose of delaying the longitudinal feed of the saw blade during a predetermined distance of the cycle of the file elements.

When it is desired to employ a swaging mechanism in conjunction with the saw tooth filing mechanism, the flat surface referred to above is utilized and functions in conjunction with a saw swaging attachment to be hereinafter described.

Practice has demonstrated that it is essential to provide a unitary presser foot mechanism in conjunction with the pair of filing elements, whereby the saw is pressed against said elements, producing a compensating effect, whereby each file element will cut uniform teeth, irrespective of variations in the hardness of the saw blade, it being understood that in welding the terminals of the endless blade, soft spots may develop.

With this problem in view, I provide a pair of presser feet 12—12', which feet are in the form of grooved rollers adapted to engage the back edge and side walls of the saw blade A, as best shown in Figures 7 and 4. The roller presser feet are revolvably mounted upon the rocker arms 13—13', which rocker arms are, in turn, pivoted upon studs 14 that are carried by ears of a slidable head 15, as best shown in Figures 1 and 5. The head 15 is mounted and guided upon a table 16 that projects from the bed 1. Horizontal adjustment of the head is effected through a screw threaded spindle 17 which engages a correspondingly threaded lug 17' that projects from the head 15. The threaded spindle is rotatably mounted in a journal formed in the table 16, and it is revolved to move the head in and out, by means of a hand crank 17", whereby horizontal adjustment of said head is effected.

After such adjustment, the head may be frictionally locked in connection with the table by means of a threaded bolt 18 which extends from said head through a slot formed in one wall of the table, the bolt being engaged by a nut 18'. The head 15' is formed with a housing 19 for the reception of a spring controlled plunger 20, which plunger engages the ends of tail extensions 13" of the rocker arms 13—13', it being understood that the ends of the arms which engage the plunger are beveled and matched in such manner that their point of contact coincides.

A stop pin 21 also projects from the head 15 between which and the plunger 20, the ends of the rocker arms extend.

From the foregoing description it will be seen that when it is desired to exert a lateral feeding pressure upon the saw blade at the spaced points of filing, the head 15 is moved away from the edge of the saw causing the yielding plunger 20 to exert force upon the rocker arms at a common point, whereby these rocker arms will, in turn, cause the presser feet rollers to force the saw blade into meshed engagement with the spiral flights of the saw element 8—8', the force of this engagement being equalized at the points of contact with the saw, whereby the pressure is of a compensating nature.

Hence, for example, if the lower file element is filing teeth which are of softer metal than the teeth upon which the upper saw element is working, the depth or cut into the softer metal is regulated by the depth of cut of the denser metal, due to the equalizing pressure of the feet, whereby the feed at both points of the work are maintained uniform as to cut.

In order to adjust the saw filing machine to the endless saw blade and to also guide it in conjunction with the presser rollers 12—12', I provide a pair of face plates 22—22', which face plates engage the opposite sides of the saw blade A and form grooves 12 and 12', it being understood that the faces of these rollers are grooved opposite each other. The upper face plate 22' is rigidly attached to the bed 1 by a foot 23', which extends therefrom, there being provision for slight adjustment of the plate with relation to the foot through a bolt and slot connection. The lower face plate 22 is arranged to swing outwardly, whereby the saw blade can be inserted in its proper position with relation to the filing elements. Hence, said face plate 22 is secured to a bracket 23, which bracket is pivotally mounted upon a stud 24 that is carried by ear extensions of the bed 1, as best shown in Figure 6. When the bracket 23 is swung to its operating position for holding the saw in connection with the guide rollers, it is locked in such position by a spring controlled dog 25, the nose of which dog engages a tooth 24' that constitutes a part of one of the ear extensions between which the bracket is mounted.

A spring 23" extends from the bracket and normally impinges against a wall of the bed 1, whereby the bracket and its associated dog is rigidly and yieldingly held in its locked position. When it is desired, therefore, to open the guide mechanism whereby the saw blade can be removed, the dog 25 of the bracket is simply unlocked, and said bracket can be then swung outwardly, as indicated in Figure 5, in which position the machine can be readily removed or inserted about the endless saw blade.

In order to provide a simple attachment to the machine for upsetting or swaging the saw teeth simultaneously with the filing operation, I provide a skeleton housing 26, having apertured feet for the reception of tie bolts 27, which tie bolts engage threaded apertures that are formed in the upper wall of the bed 1, as best shown in Figures 4 and 7 of the drawings, there being lock and check nuts in connection with the tie bolts, whereby the housing can be adjusted slightly in a longitudinal direction with relation to the saw blade and other fittings. The housing also has an arm extension 26' which terminates with a bearing for the upper end of the spindle 2'. The housing is also formed with a dovetail channel 27 which serves as a guide for a reciprocated plunger 28. The plunger is provided with a roller at one end, which roller is engaged by a cam 29 that is fixed on the spindles 2'. The plunger has connected thereto, a pair of toggle links 30 which links, in turn, are pivotally connected to levers 31 having pivotally mounted at their forward ends, die-blocks 32. The die-blocks carry hardened steel swaging plates 32' which are arranged to gauge and upset or swage the teeth of the saw blade. One of the companion pivoted die-blocks 32 carry a threaded bolt 33 which engages a cupped boss 33' that extends from the other die-blocks. The engagement being effected when the swaging operation takes place, whereby the die-blocks will fulcrum upon the parts 33 and 33', prior to the final upsetting operation, it being understood that the die-blocks and associated parts, such as the levers 31, will be hereinafter referred to as "swaging jaws", which jaws are pivotally mounted upon the arm 26' through the arms 31. The arms 31 are also connected by a coil spring 34, whereby the die-blocks 32 are normally held open.

The cam 29 is so positioned with relation to the flat surface 11 of the spirally arranged file elements, that when the flat surfaces of each file element is traveling past the cutting face of the associated saw blade teeth, the said cam imparts a positive rearward motion to the plunger 28 in opposition to the coil spring 34, whereby a swaging operation is effected.

In this exemplification of my invention, the high or working part of the cam extends through approximately 90° equalling the distance of the flat surfaces 11 of the file elements referred to, When it is desired to remove the swaging mechanism, it can be done by loosening the nuts associated with the bolts 27 or by removing the bolts.

However, under ordinary conditions, if swaging is not required, the die-blocks 32 can be swung about their pivot points, whereby they are sufficiently spread apart to permit an idle operation of the levers 31.

In order to reduce the cost of manufacture of the file elements, I preferably construct the spiral flight 8 primarily from a blank or disk. The disk is provided with a central aperture and is radially split, whereby the same can be, by a die operation, formed in a spiral of the desired pitch. As for example in this instance, the pitch is equal to the space of the two teeth of the saw blade. Hence in each revolution of the file elements, the saw blade will be automatically longitudinally fed, a distance of two teeth, which feeding operation is effected simultaneously by both of the file elements operating in opposite directions, as previously stated.

In order to provide a hub or boss for the spiral file flight so formed, a pair of cast thimbles are provided, the faces thereof which are arranged to fit the spiral flight being complementary to the faces of said flight, whereby the parts will fit snugly together and can readily be assembled, it being understood that when so assembled, shoulders or collars upon the spindles in connection with the threaded nuts will hold these parts together. The said separable elements of the spiral files are clearly shown in Figures 8, 8ᵃ to 8ᶜ inclusive.

While I have shown one simple exemplification of my invention in all its details, it is understood that I may vary the structural features within the scope of the claims as they will be hereinafter understood by mechanics skilled in the art of constructing saw filing machinery.

I claim:

1. A saw filing machine comprising a spirally wound file element, having end portions which terminate short of overlapping each other, means for imparting rotation thereto, means for guiding and yieldingly pressing the saw tooth to the file elements, said file elements being provided with flat segmental portions and with a peripheral cutting edge adapted to operate upon the backs of the teeth, and a segmental cutting surface upon its upper face adapted to operate upon the cutting face of the teeth.

2. A band saw sharpening machine comprising oppositely rotated right and left spiral file elements shaped to conform and mesh with the cutting faces and backs of the saw teeth, and having end portions which terminate short of overlapping each other, the flights of the file elements being provided with flat segmental surfaces and with abrading surfaces in radial spaced relation, whereby the cutting faces of groups of teeth are alternately operated upon, and a yieldable compensating presser foot mechanism for forcing the band saw teeth into engagement with both file elements.

3. A band saw sharpening machine comprising a pair of oppositely rotated right and left spaced spirally wound file elements, having edges corresponding to the contour of the saw teeth to be worked upon, means for driving the saw elements in opposite directions, a compensating link connected pressure foot mechanism for holding the saw teeth into meshed engagement with each file element, the said file elements having segmental cutting surfaces spaced with relation, thereto, for operating upon the cutting surfaces of the teeth alternately.

4. A band saw sharpening machine comprising a pair of oppositely rotated right and left spaced spirally wound file elements, having edges corresponding to the contour of the saw teeth to be worked upon, means for driving the saw elements in opposite directions, a compensating link connected pressure foot mechanism for holding the saw teeth into meshed engagement with each file element, the said file elements having segmental cutting surfaces spaced with relation thereto, for operating upon the cutting surfaces of the teeth alternately, and means for adjusting the file elements relative to each other, whereby the gauge of the saw blade teeth operated upon is maintained.

5. In a band saw sharpening machine, a pair of oppositely rotated right and left spiral file elements, having end portions which terminate short of overlapping each other, the said file elements being axially aligned and spaced apart a predetermined distance and having flat segmental portions, and means for varying the distance between said file elements.

6. A band saw sharpening machine comprising a pair of oppositely rotated right and left spirally wound file elements, having end portions which terminate short of overlapping each other, the said file elements being spaced apart a predetermined distance and having flat segmental portions, and a compensating yieldable presser foot mechanism for holding the saw worked upon against the file elements.

7. In a band saw filing machine having right and left spirally aligned file elements, the combination of a presser foot mechanism therefor, the same including a pair of rocker arms having rollers for engagement with the back of the saw opposite each file element, and a yielding tensioning means engageable with the rocker arms.

8. In a band saw filing machine having right and left spirally aligned file elements, the combination of a presser foot mechanism comprising rocker arms having rollers adapted to engage the back of the saw opposite the file elements, and tail extensions positioned at a common point, a screw controlled head upon which the rocker arms are mounted, and a yieldable plunger carried by the head engageable with the rocker arm tails.

9. In a band saw filing machine having right and left spirally aligned file elements, the combination of a presser foot mechanism adapted to engage the back of the saw opposite each file element, the presser foot mechanism including a spring controlled pair of rocker arms adapted to exert an equalizing force upon the saw teeth operated upon by each filing element, whereby uniformity of the cut is maintained irrespective of variations of the temper of the saw blade.

10. A band saw sharpening and setting machine comprising axially aligned oppositely rotated spindles, right and left spirally wound file elements carried by the spindle, the flights of each file element having associated flat sections permitting delay of the longitudinal feed of the saw, a saw setting mechanism, an actuating cam for the saw setting mechanism mounted upon one of the spindles, the said cam being timed with relation to the flat sections of the file elements, whereby the teeth of the saw are set coincident to delay of the longitudinal feed of said saw, due to engagement of the flat file sections with the saw teeth.

11. A band saw filing and setting machine comprising a bed, axially aligned oppositely driven spindles journalled in the bed, right and left spiral file elements mounted upon the spindles having edges corresponding in shape to the contour of the file blade to be worked upon, means for guiding and yieldably pressing the saw blade against the peripheral edges of the file elements, a cam mounted upon one of the spindles, a spring controlled plunger engageable with the cam, and saw setting swaging jaws connected to the plunger.

12. A combined band saw sharpening and swaging machine comprising a pair of spaced right and left spiral file elements having filing edges corresponding to the contour of the teeth of the saw to be worked upon, the spiral flights of the saw elements being adapted to lead the saw longitudinally, means for guiding and holding the saw in meshed engagement with the file elements, a pair of saw setting die-blocks, and actuating means for the saw setting die-blocks associated with movement of the file elements, whereby the saw teeth are set following each saw tooth filing operation.

13. A rotatory file comprising an apertured disk radially split and offset at its division point to form an interrupted spiral flight with ends terminating short of overlapping each other, and also having a flat segmental portion and upper and lower hub members having upper and lower surfaces coincident with the spiral faces of said disk.

In testimony that I claim the foregoing I have hereunto set my hand at Racine, in the county of Racine and State of Wisconsin.

OSCAR H. BANKER.